US008798526B2

(12) United States Patent
Ji et al.

(10) Patent No.: US 8,798,526 B2
(45) Date of Patent: Aug. 5, 2014

(54) METHOD AND APPARATUS FOR SELECTING AND PROCESSING SIGNALS FROM A SOURCE STATION AND RELAY STATIONS

(75) Inventors: Tingfang Ji, San Diego, CA (US); Arnab Chakrabarti, San Diego, CA (US); Anastasios Stamoulis, San Diego, CA (US); Dexu Lin, San Diego, CA (US); Kambiz Azarian Yazdi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1142 days.

(21) Appl. No.: 12/490,070

(22) Filed: Jun. 23, 2009

(65) Prior Publication Data
US 2009/0325480 A1    Dec. 31, 2009

Related U.S. Application Data

(60) Provisional application No. 61/076,517, filed on Jun. 27, 2008.

(51) Int. Cl.
*H04B 7/14* (2006.01)
*H04B 3/36* (2006.01)

(52) U.S. Cl.
USPC ............... 455/8; 455/10; 455/11.1; 455/13.1; 455/15; 455/20; 370/274; 370/315; 370/492; 370/501; 375/211; 375/132; 342/15; 342/353

(58) Field of Classification Search
USPC ........... 455/8, 7, 9, 10, 11.1, 13.1, 15, 16, 20, 455/22, 24, 408, 410, 411, 450; 370/274, 370/278, 279, 315, 492, 498, 501; 375/211, 375/214, 132; 342/15, 353
See application file for complete search history.

(56) References Cited

U.S. PATENT DOCUMENTS

| 7,233,771 B2 | 6/2007 | Proctor, Jr. et al. |
| 2005/0014464 A1* | 1/2005 | Larsson ............. 455/11.1 |
| 2007/0066220 A1* | 3/2007 | Proctor et al. ...... 455/11.1 |

(Continued)

FOREIGN PATENT DOCUMENTS

| CN | 1795651 A | 6/2006 |
| JP | 2007500482 A | 1/2007 |

(Continued)

OTHER PUBLICATIONS

International Search Report & Written Opinion—US2009/048721—International Search Authority—European Patent Office—Nov. 17, 2009.
Taiwan Search Report—TW098121696—TIPO—Jan. 7, 2013.

*Primary Examiner* — Shaima Q Aminzay

(57) ABSTRACT

Techniques for selecting and processing signals from different stations in a wireless network are described. A destination station may receive a direct signal from a source station and at least one relay signal from at least one relay station. The destination station may determine metrics for the source and relay stations, e.g., based on pilots received from these stations. The destination station may select at least one signal to process from among the direct and relay signals based on the metrics for the source and relay stations. The destination station may select the direct signal if the metric for the source station exceeds a threshold. The destination station may select the relay signal from each relay station having a metric exceeding at least one threshold. The destination station may process the at least one selected signal to recover a transmission sent by the source station to the destination station.

30 Claims, 6 Drawing Sheets

(56) References Cited

U.S. PATENT DOCUMENTS

| | | | |
|---|---|---|---|
| 2007/0155338 A1* | 7/2007 | Hong et al. | 455/69 |
| 2008/0025323 A1* | 1/2008 | Khan | 370/400 |
| 2008/0274692 A1* | 11/2008 | Larsson | 455/24 |
| 2010/0091679 A1* | 4/2010 | Ionescu et al. | 370/252 |
| 2010/0304665 A1 | 12/2010 | Higuchi | |
| 2011/0256827 A1* | 10/2011 | Hart | 455/9 |

FOREIGN PATENT DOCUMENTS

| | | |
|---|---|---|
| JP | 2009177628 A | 8/2009 |
| JP | 2010501140 A | 1/2010 |
| WO | WO2004107693 A1 | 12/2004 |
| WO | WO2006121381 | 11/2006 |
| WO | WO-2008042192 A1 | 4/2008 |
| WO | WO-2009093406 A1 | 7/2009 |

\* cited by examiner

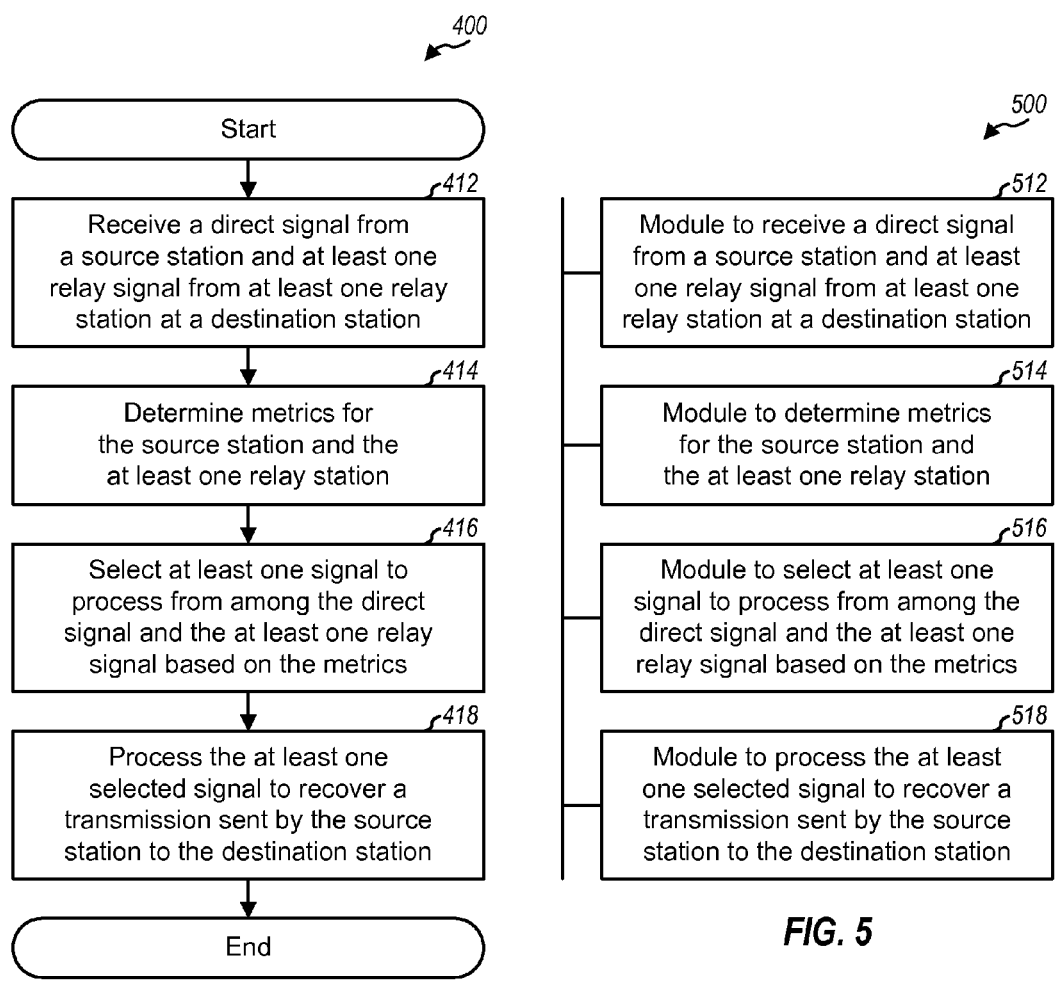

METHOD AND APPARATUS FOR SELECTING AND PROCESSING SIGNALS FROM A SOURCE STATION AND RELAY STATIONS

The present application claims priority to provisional U.S. Application Ser. No. 61/076,517, entitled "CRITERIA FOR COMBINING SIGNALS FROM DIRECT AND RELAYED CHANNELS," filed Jun. 27, 2008, assigned to the assignee hereof and incorporated herein by reference.

BACKGROUND

I. Field

The present disclosure relates generally to communication, and more specifically to transmission techniques for wireless communication.

II. Background

Wireless communication networks are widely deployed to provide various communication services such as voice, video, packet data, messaging, broadcast, etc. These wireless networks may be capable of supporting communication for multiple users by sharing the available network resources. Examples of such wireless networks include wireless wide area networks (WWANs) providing communication coverage for large geographic areas, wireless metropolitan area networks (WMANs) providing communication coverage for medium geographic areas, and wireless local area networks (WLANs) providing communication coverage for small geographic areas.

It may be desirable to improve the coverage of a wireless network. This may be achieved by using relay stations. A relay station may receive a signal from a first station (e.g., a source station), process (e.g., demodulate and decode) the received signal to recover data sent in the signal, generate a relay signal based on the recovered data, and send the relay signal to a second station (e.g., a destination station). The use of relay stations may increase network capacity and improve energy efficiency in the wireless network. However, the use of relay stations may also increase overhead and incur other penalties.

SUMMARY

Techniques for selecting and processing signals from different stations in a wireless network are described herein. A source station may transmit a direct signal containing a transmission for a destination station. At least one relay station may receive the direct signal, and each relay station may transmit a relay signal. The destination station may receive the direct signal from the source station as well as at least one relay signal from the at least one relay station.

In an aspect, the destination station may determine metrics for the source and relay stations. In one design, the destination station may determine a metric for each station based on pilot received from that station. The metric for each station may be based on a received signal strength parameter, a received signal quality parameter, etc. The destination station may select at least one signal to process from among the direct signal and the at least one relay signal based on the metrics for the source and relay stations. The destination station may then process the at least one selected signal to recover the transmission sent by the source station to the destination station.

In one design, the destination station may select the direct signal if the metric for the source station exceeds a first threshold. The first threshold may be determined based on a predetermined value or the best metric among at least one metric for the at least one relay station. In one design, the destination station may select the relay signal from each relay station having a metric exceeding second and/or third thresholds. The second threshold may be determined based on the best metric, and the third threshold may be determined based on the metric for the source station. The destination station may also select the direct signal and/or the at least one relay signal in other manners.

In other designs, relay selection may be performed by the source station, or by a relay station, or by the source and destination stations, or by some other combination of stations. For example, a relay station may decide to help the source station to perform retransmission if the relay station has successfully decoded the signal from the source station. The relay station may decide to do nothing if it did not decode the signal from the source station, e.g., even if the destination station observes good received signal quality from this relay station.

In one design, only relay stations with relay signals selected for processing may send the transmission for the destination station in their relay signals. In another design, each relay station may send the transmission in its relay signal regardless of whether or not the relay signal is selected for processing.

In one design, the direct signal and the at least one relay signal may be transmitted in accordance with single frequency network (SFN). The destination station may process the at least one selected signal together to recover the transmission. In another design, the destination station may process each selected signal separately and may then combine all processed signals to recover the transmission.

Various aspects and features of the disclosure are described in further detail below.

BRIEF DESCRIPTION OF THE DRAWINGS

FIG. 4 shows a process for receiving a transmission.
FIG. 5 shows an apparatus for receiving a transmission.

DETAILED DESCRIPTION

The techniques described herein may be used for various wireless communication networks such as WWANs, WMANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) and LTE-Advanced (LTE-A) are new releases of "3rd Generation Partnership Project" (3GPP) that use E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The techniques described herein may be used for the wireless networks and radio technologies mentioned above as well as other wireless networks and radio technologies.

Figure 1:
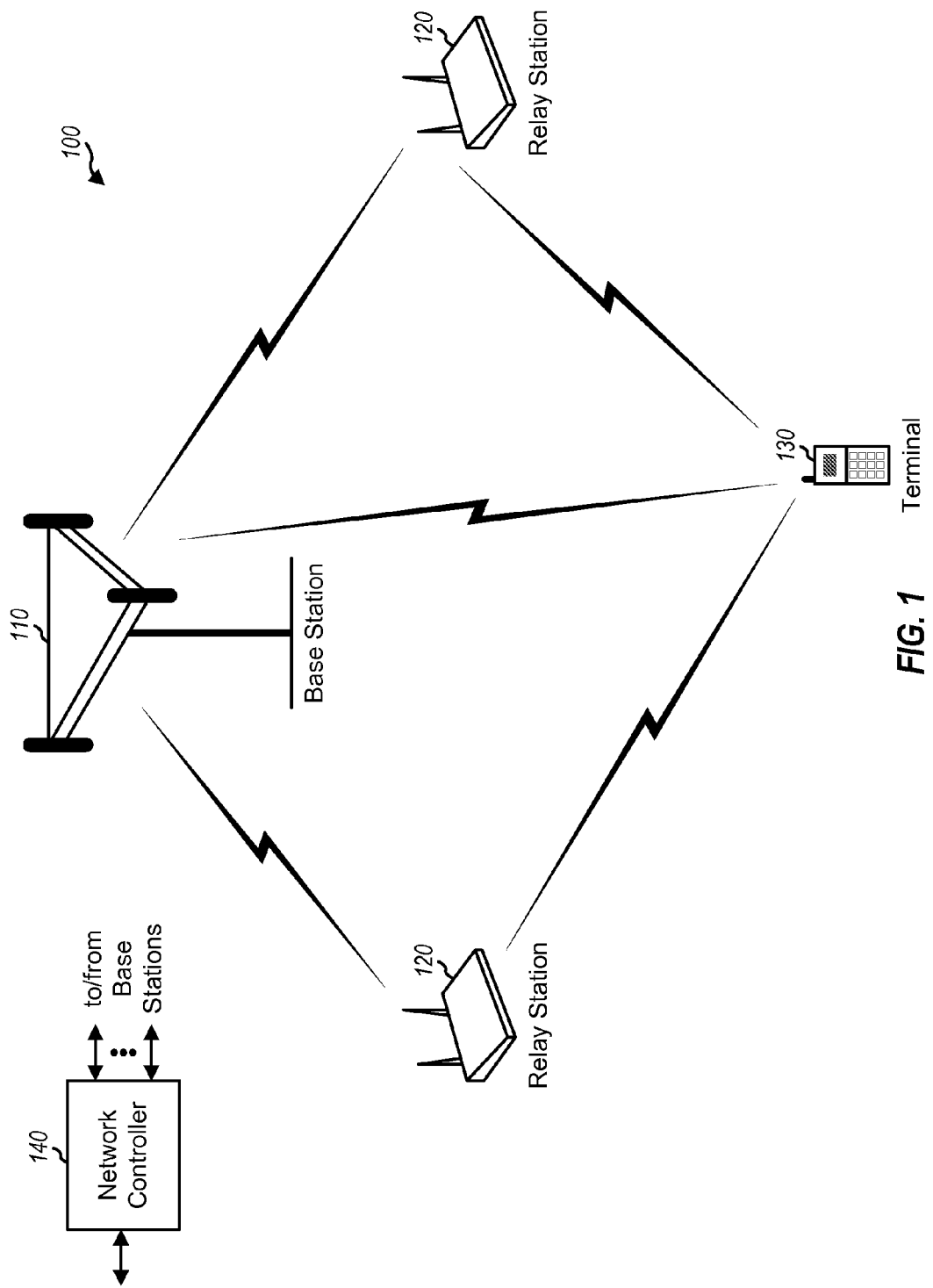
FIG. 1 shows a wireless communication network.

FIG. 1 shows a wireless communication network 100. For simplicity, only one base station 110, two relay stations 120, one terminal 130, and one network controller 140 are shown in FIG. 1. In general, a wireless network may include any number of entities of each type.

Base station 110 may be a station that communicates with the terminals and may also be referred to as a Node B, an evolved Node B (eNB), an access point, etc. Base station 110 may provide communication coverage for a particular geographic area. Network controller 140 may couple to a set of base stations and provide coordination and control for the base stations. Network controller 140 may be a single network entity or a collection of network entities.

Terminal 130 may be located anywhere within the wireless network and may be stationary or mobile. Terminal 130 may also be referred to as an access terminal, a mobile station, a user equipment, a subscriber station, a station, etc. Terminal 130 may be a cellular phone, a personal digital assistant (PDA), a wireless communication device, a handheld device, a wireless modem, a laptop computer, a cordless phone, a wireless local loop (WLL) station, etc. Terminal 130 may communicate with base station 110 on the forward and reverse links. The forward link (or downlink) refers to the communication link from the base station to the terminal, and the reverse link (or uplink) refers to the communication link from the terminal to the base station. Terminal 130 may also communicate peer-to-peer with other terminals (not shown in FIG. 1). Terminal 130 may also send signals to and/or receive signals from relay stations 120, with or without knowledge of terminal 130.

Relay stations 120 may be stations that receive signals from upstream stations and send signals to downstream stations. Relay stations 120 may support data transmission on the forward link and/or reverse link. On the forward link, a relay station may receive a forward link signal from a base station (e.g., base station 110), process the forward link signal for a specific terminal (e.g., terminal 130) to recover a transmission sent to the terminal, generate a forward link relay signal containing the transmission, and transmit the forward link relay signal to the terminal. On the reverse link, the relay station may receive reverse link signals from different terminals, process the received signal for a specific terminal (e.g., terminal 130) to recover a transmission sent by the terminal, generate a reverse link relay signal containing the transmission, and transmit the reverse link relay signal to base station 110. A transmission may comprise data, control information, pilot, etc. In general, relay stations 120 may relay transmissions for only the forward link, or only the reverse link, or both the forward and reverse links. Relay stations 120 may also relay transmissions for any number of terminals on each of the forward and reverse links.

Figure 2:
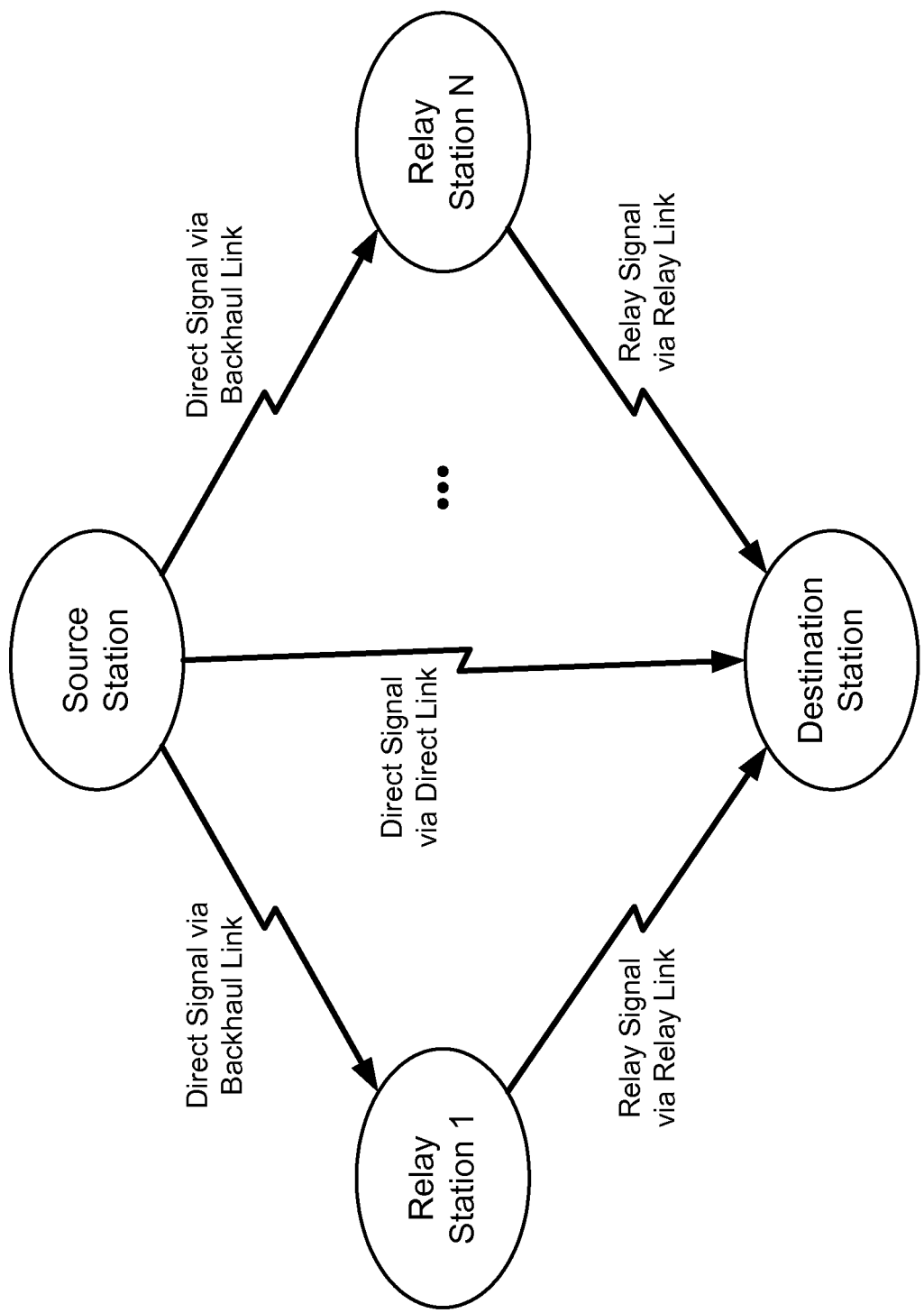
FIG. 2 shows data transmission using relays.

FIG. 2 shows data transmission in wireless network 100 using relay stations. The entities transmitting and/or receiving signals may be referred to as stations, nodes, etc. A station originating a data transmission may be referred to as a source station, or simply a source. A station to which the data transmission is sent may be referred to as a destination station, or simply a destination. The link from the source to the destination may be referred to as a direct link, and the signal from the source to the destination may be referred to as a direct signal. A station forwarding the data transmission may be referred to as a relay station, or simply a relay. N relays 1 through N may receive the direct signal from the source, where N may be any integer value. The link from the source to each relay may be referred to as a backhaul link. The link from each relay to the destination may be referred to as a relay link, and the signal from the relay to the destination may be referred to as a relay signal.

Due to the widespread and pervasive nature of the wireless medium, the destination may be able to receive the direct signal from the source as well as one or more relay signals from one or more relays. The destination may be able to obtain improved performance by combining the direct signal and the relay signals. However, combining signals may incur the cost of additional processing, increased latency, and other overhead.

In an aspect, one or more criteria may be used to identify situations in which combining signals from the source and relays may be beneficial. Furthermore, if multiple relays are present, then criteria may be used to select one or more specific relays whose signals are of sufficiently high quality for combining. In general, combining signals from different stations may lead to substantial gains only when the signals are of comparable quality or strength. In certain scenarios, the direct link may be much stronger than the relay links. In these scenarios, it may not be beneficial for the relays to even transmit relay signals to the destination. In other scenarios, one or more relay links may be much stronger than the direct link. In these scenarios, there may be little gain in performance from using the direct signal from the direct link.

A metric may be used to quantify the quality or strength of the direct link and the relay links. In general, a metric may be defined based on one or more parameters for received signal strength, received signal quality, overhead cost, etc. Some example parameters for received signal strength may include received pilot strength, received pilot power, received signal power, pathloss, channel strength, etc. Some example parameters for received signal quality may include signal-to-noise ratio (SNR), signal-to-noise-and-interference ratio (SINR), energy-per-chip-to-total-received-power ratio (Ec/Io), carrier-to-interference ratio (C/I), etc. Some example parameters for overhead cost may include processing resources, latency, interference to the wireless network due to relay signals, relay power consumption, etc. A metric may be defined based on a single received signal strength parameter (e.g., received pilot power), a single received signal quality parameter (e.g., SINR), a weighted sum of different parameters, etc. A metric may be defined for projected downlink data rate, projected uplink data rate, etc. For a relay, the projected data rates may be dependent on the strength or quality of the backhaul and access link. Regardless of how the metric may be defined, for simplicity, the following description assumes that the metric has a non-negative value and that a higher value is better. Limiting the description to a non-negative, higher-value-better metric leads to no loss of generality. For example, a metric M may be defined to have negative values. A new metric M' may then be defined as M'=exponent (M) and would be all positive, without loss of monotonicity. As another example, a metric M may be defined such that lower values are better. In this case, −M may be used as a metric instead of M and would have higher values better.

The metric for the direct link from the source to the destination may be denoted as $M_S$. The metric for the relay link from the i-th relay to the destination may be denoted as $M_{Ri}$, for $i \in \{1, \ldots, N\}$, where N is the number of relays. The metrics for the N relays may be sorted so that $M_{R1} \geq$ $M_{R2} \geq \ldots \geq M_{RN}$, where $M_{R1}$ is the best metric for the best relay link and $M_{RN}$ is the worst metric for the worst relay link.

In one design, the destination may select the direct signal from the source for processing if the following criterion is satisfied:

$$M_S > K_1 \cdot M_{R1}, \quad \text{Eq (1)}$$

where $K_1$ is a suitably selected non-negative constant. In the design shown in equation (1), the direct signal may be selected if its metric $M_S$ is greater than a dynamic threshold determined by the metric $M_{R1}$ of the best relay link and constant $K_1$. The direct signal may be omitted from processing otherwise. Constant $K_1$ may be defined such that the direct signal is selected if its metric is better than a predetermined percentage of the best relay metric.

In another design, the destination may select the direct signal from the source for processing if the following criterion is satisfied:

$$M_S > T_S, \quad \text{Eq (2)}$$

where $T_S$ is a suitably selected fixed threshold. In the design shown in equation (2), the direct signal may be selected if its metric $M_S$ is greater than the fixed threshold $T_S$ and may be omitted otherwise.

In yet another design, the destination may select the direct signal from the source if the criteria in both equations (1) and (2) are satisfied. $T_S$ may be a minimum threshold used to ensure that the direct signal is above some minimum quality before it can be selected. $K_1 \cdot M_{R1}$ may be used to ensure that the direct signal will provide some gain when combined with the best relay signal.

In one design, the destination may select the relay signal from the i-th relay for processing if the following criteria are satisfied:

$$M_{Ri} > K_2 \cdot M_{Rth}, \text{ and} \quad \text{Eq (3a)}$$

$$M_{Ri} > K_3 \cdot M_S, \text{ for } i \in \{1, \ldots, N\}, \quad \text{Eq (3b)}$$

where $K_2$ and $K_3$ are suitably selected non-negative constants, and $M_{Rth}$ is a threshold metric. $M_{Rth}$ may be equal to the best metric $M_{R1}$ or a predetermined value.

In the design shown in equation set (3), the relay signal from the i-th relay may be selected if its metric is greater than both (i) a first dynamic threshold determined by the metric $M_{R1}$ of the best relay link and constant $K_2$ and (ii) a second dynamic threshold determined by the metric $M_S$ of the source and constant $K_3$. The relay signal may be omitted otherwise. In another design, the relay signal from the i-th relay may be selected if the criterion in equation (3a) is satisfied. In yet another design, the relay signal from the i-th relay may be selected if the criterion in equation (3b) is satisfied.

In another design, the destination may select the relay signal from the i-th relay for processing if the following criterion is satisfied:

$$M_{Ri} > T_R, \quad \text{Eq (4)}$$

where $T_R$ is a suitably selected fixed threshold. In the design shown in equation (4), the relay signal from the i-th relay may be selected if its metric $M_{Ri}$ is greater than a fixed threshold $T_R$ and may be omitted otherwise.

Some exemplary criteria for determining whether or not to select the direct signal and whether or not to select a relay signal are given above. These criteria may be used to identify situations in which combining signals may be beneficial. Other criteria may also be used to determine whether or not to select the direct signal and the relay signals. Furthermore, the selection of a relay signal may be dependent on one or more conditions, e.g., for any of the overhead costs noted above.

The constants $K_1$, $K_2$ and $K_3$ and the thresholds $T_S$ and $T_R$ may be determined based on computer simulation, empirical measurement, field testing, etc. The constants and thresholds may be defined to provide good performance. The constants and thresholds may be fixed values that may be stored at the destination. Alternatively, the constants and thresholds may be configurable values that may be dependent on any factor.

The designs described above assume that the backhaul link for each relay is sufficiently good and that the impact of the backhaul link to the metric $M_{Ri}$ can be ignored. In another design, a metric for the backhaul link from the source to the i-th relay may be determined and denoted as $M_{SRi}$, for $i \in \{1, \ldots, N\}$. The metric $M_{Ri}$ for the relay link from the i-th relay to the destination may then take into account the metric $M_{SRi}$ for the corresponding backhaul link.

A decision on whether to select or omit a particular signal may be made at a design stage or after deployment based on channel conditions. For example, on the forward link of a cellular network with relays, a relay may be constrained to communicate only with terminals having strong channels to the relay. In this case, the metric Ms for the source may be much smaller than the metric $M_{R1}$ for the best relay, and the criterion in equation (1) would not be satisfied. Therefore, at the design stage, it may be possible to preclude the possibility of using the direct signal. The destination would then not need to compute the metric $M_S$ for the source and would not need to process the direct signal. On the other hand, in a wireless network where terminals may act as relays for one another, the criteria in equation set (3) may be used to determine which terminals can be viable relays.

In one design, the source and the relays may transmit different pilots, which may allow the destination to identify the different stations. Pilot is data that is known a priori by a transmitter station and a receiver station and may be used by the receiver station for various purposes such as channel estimation, signal strength and/or quality measurement, transmitter identification, time and/or frequency acquisition, etc. Pilot may also be referred to as a reference signal, training, preamble, etc.

The source and relays may transmit pilots in various manners. In one design, code division multiplexing (CDM) may be used for the pilots. Different stations may generate their pilots with different scrambling codes and/or different orthogonal codes and may transmit their pilots concurrently, e.g., on the same time and frequency resources in order to reduce pilot overhead. In another design, frequency division multiplexing (FDM) may be used for the pilots. Different stations may transmit their pilots on different sets of subcarriers, and these pilots may be orthogonal to one another in the frequency domain. In yet another design, time division multiplexing (TDM) may be used for the pilots. Different stations may transmit their pilots in different time intervals, and these pilots may be orthogonal to one another in the time domain. In general, the pilots from different stations may utilize any one or any combination of multiplexing schemes. Each station may transmit its pilot periodically to allow other stations to detect that station and to measure received signal strength and/or received signal quality for the station.

The metric for each station may be determined in various manners. In one design, the destination may receive the pilot from each station and may determine the metric for that station based on the received pilot. In another design, the destination may determine the metric for each station based on other transmission from the station.

The relays may operate in various manners. In one design, the relays may continually receive the direct signal from the source and may continually transmit relay signals to the destination. The destination may continually receive the relay signals and may decide whether or not to select each relay signal based on any of the designs described above.

In another design, the relays may be selectively enabled or disabled to transmit relay signals to the destination. The destination may compute metrics for the source and the relays based on pilots received from these stations. The destination may then determine whether or not to enable each relay based on any of the designs described above. The destination may communicate with each enabled relay to request that relay to transmit a relay signal to the destination. Alternatively, the destination may communicate with the source, which may in turn communicate with each enabled relay to request that relay to transmit a relay signal to the destination. In any case, the destination may process the relay signals from all enabled relays. This design may reduce interference in the wireless network since each relay may transmit a relay signal comprising transmissions for only destinations that have enabled that relay.

The relays may transmit the relay signals in various manners. In one design, the relays may transmit the relay signals so that they resemble the direct signal from the source, e.g., except for the distinguishable pilots used for station identification. The relay signals and the direct signal may then appear like SFN signals. The relay signals and the direct signal may have the same demodulation pilot, which may be used by the destination to obtain an overall channel estimate for both the relay links and the direct link. The destination may obtain a received signal comprising the relay signals and the direct signal, derive the overall channel estimate based on the demodulation pilot, and perform coherent detection on the received signal with the overall channel estimate. The destination may not need to distinguish between the relay signals and the direct signal. This design may be used, e.g., when each relay can be enabled or disabled.

In another design, the relays may transmit the relay signals so that they can be distinguished by the destination. For example, different relays may use different scrambling sequences to generate their relay signals. The distinguishable relay signals may allow the destination to select or omit each relay signal.

In yet another design, the relays may transmit the relay signals to provide time, frequency and/or spatial diversity. For example, the source and a relay may transmit their signals to provide space-time transmit diversity (STTD). For STTD, the source may transmit two output symbols $s_a$ and $s_b$ in two consecutive symbol periods 1 and 2, respectively, to the destination. The relay may transmit output symbols $-s_b^*$ and $s_a^*$ in the same two consecutive symbol periods 1 and 2, respectively. Each output symbol is thus sent from two stations in two symbol periods and observes both time and spatial diversity.

For STTD, the destination may obtain two received symbols $r_1$ and $r_2$ in two consecutive symbol periods 1 and 2, respectively. The destination may recover the two output symbols as follows:

$$\hat{s}_a = h_1^* \cdot r_1 + h_2 \cdot r_2^*, \text{ and} \quad \text{Eq (5a)}$$

$$\hat{s}_b = -h_2 \cdot r_1^* + h_1^* \cdot r_2, \quad \text{Eq (5b)}$$

where $h_1$ and $h_2$ are estimated channel gains for symbol periods 1 and 2, respectively, and $\hat{s}_a$ and $\hat{s}_b$ are estimates of output symbols $s_a$ and $s_b$, respectively.

The source and the relay may also transmit their signals to provide space-frequency transmit diversity (SFTD). For SFTD, the source may transmit two output symbols $s_a$ and $s_b$ on two subcarriers 1 and 2, respectively, in one symbol period to the destination. The relay may transmit output symbols $-s_b^*$ and $s_a^*$ on the same two subcarriers 1 and 2, respectively, in the same symbol period. Each output symbol is thus sent from two stations on two subcarriers and observes both frequency and spatial diversity.

STTD and SFTD are typically used to transmit a pair of output symbols from two antennas at one station in two consecutive symbol periods or subcarriers. For STTD or SFTD with two stations, the source may use one antenna, and the relay may mimic the second antenna of the source. The destination may be informed when STTD or SFTD is employed by the source and the relay. The destination may then perform demodulation for STTD or SFTD, e.g., as shown in equation set (5).

In one design, the source and relays may generate their signals in accordance with hybrid automatic repeat request (HARQ). With HARQ, a transmitter station may send one or more transmissions of a packet of data, one transmission at a time, until the packet is decoded correctly by a receiver station, or the maximum number of transmissions has been sent, or some other termination condition is encountered. HARQ may improve reliability of data transmission and support rate adaptation for packets in the presence of changing channel conditions.

For HARQ, a relay may receive each transmission of a packet for the destination and may decode the transmission to recover the packet. Upon correctly decoding the packet, the relay may generate remaining transmissions of the packet in the same manner as the source based on the decoded packet. The relay may then send each remaining transmission of the packet to the destination, e.g., on the same time and frequency resources used by the source for that transmission. The destination may receive one or more transmissions of the packet from only the source until the packet is decoded correctly by the relay. The destination may receive one or more remaining transmissions of the packet from both the source and the relay after the packet is decoded correctly by the relay.

Figure 3:
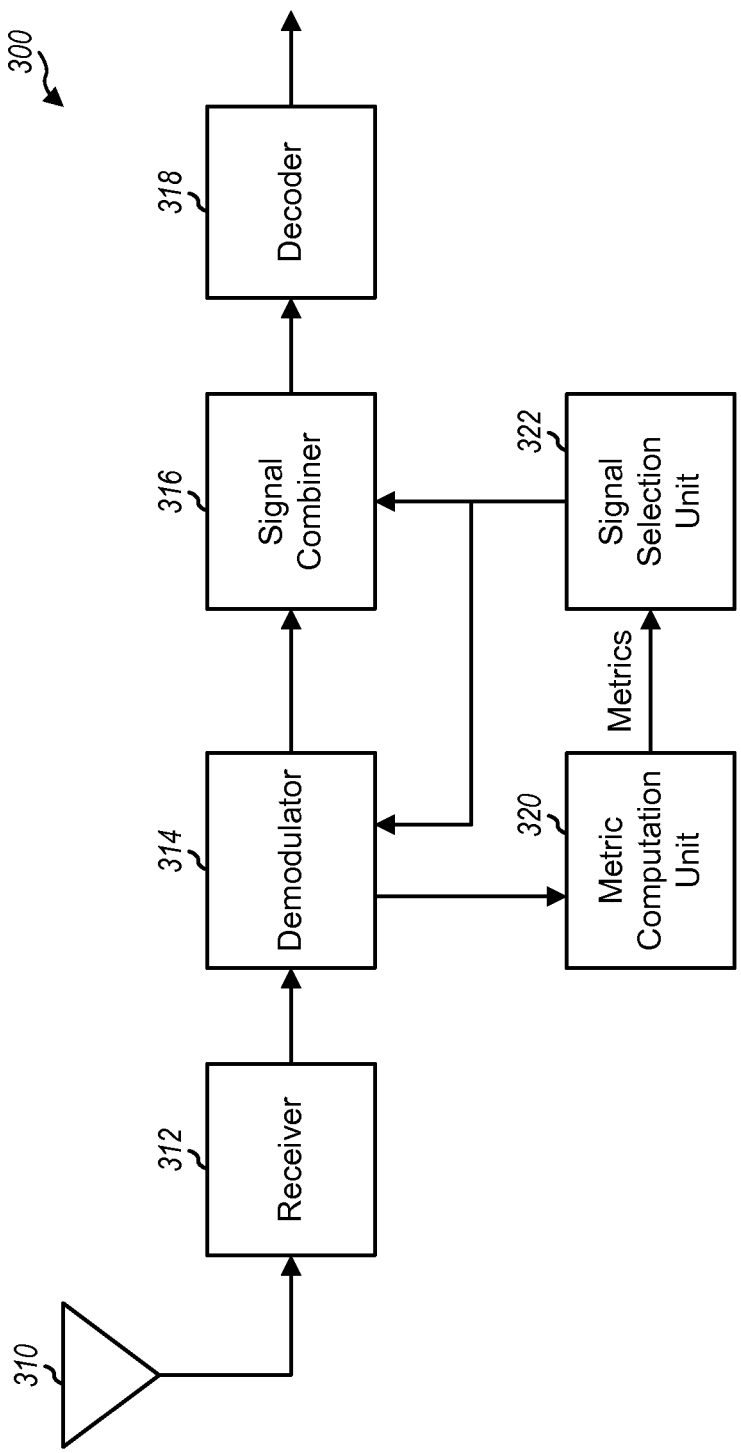
FIG. 3 shows a block diagram of a destination station.

FIG. 3 shows a block diagram of a design of a destination 300, which may be terminal 130 for data transmission on the forward link or base station 110 for data transmission on the reverse link. At destination 300, an antenna 310 may receive a direct signal from a source and any number of relay signals from any number of relays. Antenna 310 may provide a received signal comprising the direct and relay signals. A receiver 312 may condition (e.g., filter, amplify, downconvert, and digitize) the received signal and provide input samples. A demodulator 314 may process the input samples to detect for signals from the source and relays. Demodulator 314 may also recover pilots from the source and relays and may provide received pilot symbols for each station.

A metric computation unit 320 may compute a metric for each station based on the received pilot symbols for that station and possibly other information. A signal selection unit 322 may receive metrics for the source and relays from unit 320 and may evaluate criteria for selecting or omitting the signal from each station. For example, unit 322 may evaluate the criterion in equation (1) or (2) to determine whether or not to select the direct signal from the source. Unit 322 may evaluate the criteria in equation set (3) or equation (4) to determine whether or not to select the relay signal from each relay. Unit 322 may also evaluate other criteria to determine whether or not to select the signal from each station. Unit 322 may provide an indication of the selected signals to demodulator 314 and a signal combiner 316.

Demodulator 314 may demodulate the input samples for a transmission sent to destination 300 and may provide received data symbols for each station whose signal is selected for processing. A signal combiner 316 may combine the received data symbols for all selected stations and may provide detected data symbols, which may be estimates of the data symbols sent by the source to destination 300. In general, demodulation and signal combining may be performed in different manners depending on how the relay signals are sent. Demodulation and signal combining may be performed separately (as shown in FIG. 3) if the direct signal and the relay signals are distinguishable, e.g., through use of different scrambling sequences, STTD, SFTD, etc. Demodulation and signal combining may also be performed together (not shown in FIG. 3) if the direct signal and the relay signals are indistinguishable, e.g., sent in an SFN manner. In any case, a decoder 318 may decode the detected data symbols and provide decoded data for destination 300.

FIG. 4 shows a design of a process 400 for receiving a transmission. Process 400 may be performed by a destination station, which may be a terminal for a forward link transmission or a base station for a reverse link transmission.

The destination station may receive a direct signal from a source station and at least one relay signal from at least one relay station (block 412). The destination station may receive each signal at any signal level, e.g., ranging from very strong to very weak, possibly below the noise floor. The destination station may determine metrics for the source station and the at least one relay station (block 414). The destination station may select at least one signal to process from among the direct signal and the at least one relay signal based on the metrics (block 416). The destination station may then process the at least one selected signal to recover a transmission sent by the source station to the destination station (block 418).

In one design of block 414, the destination station may receive pilots from the source station and the at least one relay station. The pilots may be sent using any of the multiplexing schemes described above, and the pilot from each station may be distinguishable by the destination station. The destination station may determine a metric for each station based on the pilot received from that station. The destination station may determine the metric for each station based on a received signal strength parameter (e.g., received pilot strength, pathloss, etc.), a received signal quality parameter (e.g., SNR, SINR, Ec/Io, C/I, etc.), and/or other parameters.

The destination station may select the at least one signal in various manners in block 416. In one design of direct signal selection, the destination station may select the direct signal if a metric for the source station exceeds a first threshold. The first threshold may be determined based on (i) the best metric among at least one metric for the at least one relay station, e.g., as shown in equation (1), or (ii) a predetermined value, e.g., as shown in equation (2).

In one design of relay signal selection, the destination station may select the relay signal from each relay station having a metric exceeding second and third thresholds. The second threshold may be determined based on the best metric, and the third threshold may be determined based on the metric for the source station, e.g., as shown in equation set (3). In another design of relay signal selection, the destination station may select the relay signal from each relay station having a metric exceeding a fourth threshold. The fourth threshold may be determined based on the best metric, the metric for the source station, or a predetermined value.

In one design of signal selection, the destination station may select the relay signal from the relay station having the best metric. The destination station may also select the direct signal if the metric for the source station exceeds the first threshold. The destination station may also select a relay signal from each remaining relay station having a metric exceeding the second and/or third thresholds.

In one design, each relay station having its relay signal selected for processing may send the transmission for the destination station in its relay signal. Each relay station having its relay signal not selected for processing may not send the transmission in the relay signal. In another design, each relay station may send the transmission for the destination station in its relay signal regardless of whether or not the relay signal is selected for processing.

In one design, the direct signal and the at least one relay signal may be transmitted in accordance with SFN. The destination station may process the at least one selected signal together to recover the transmission sent to the destination station. In another design, multiple signals may be selected for processing based on the metrics. The destination station may process the multiple signals separately to obtain multiple processed signals and may then combine the processed signals to recover the transmission sent to the destination station. The combining may entail summing detected symbols from different selected signals. The combining may also be performed in accordance with STTD or SFTD, e.g., as shown in equation set (5).

FIG. 5 shows a design of an apparatus 500 for receiving a transmission. Apparatus 500 includes a module 512 to receive a direct signal from a source station and at least one relay signal from at least one relay station at a destination station, a module 514 to determine metrics for the source station and the at least one relay station, a module 516 to select at least one signal to process from among the direct signal and the at least one relay signal based on the metrics, and a module 518 to process the at least one selected signal to recover a transmission sent by the source station to the destination station.

Figure 6:
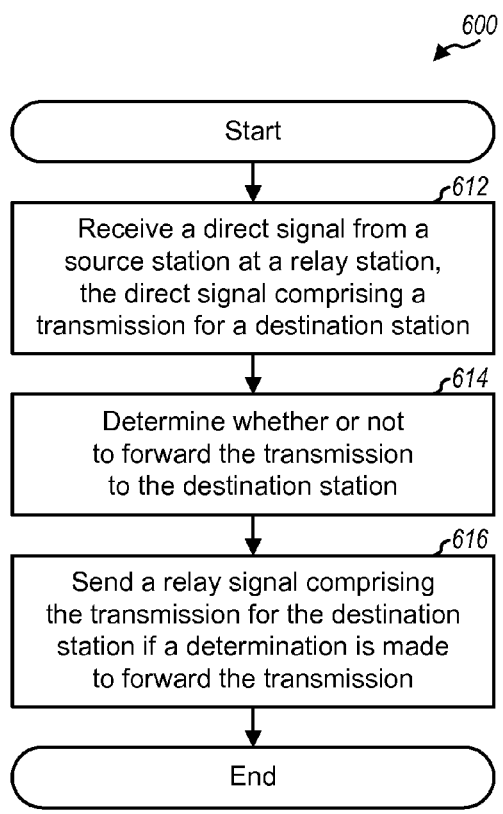
FIG. 6 shows a process for relaying a transmission.

FIG. 6 shows a design of a process 600 for relaying a transmission. Process 600 may be performed by a relay station. The relay station may receive from a source station a direct signal comprising a transmission for a destination station (block 612). The relay station may determine whether or not to forward the transmission to the destination station (block 614). The relay station may send a relay signal comprising the transmission for the destination station if a determination is made to forward the transmission (block 616). The relay station may send the relay signal without the transmission for the destination station if a determination is made to not forward the transmission. The relay station may also listen for new transmissions from the source station if a determination is made to not forward the transmission. This may be pertinent since a relay station transmitting a relay signal may not be able to listen to new transmissions from the source station due to inability to transmit and receive at the same time on the same frequency band.

The determination on whether or not to forward the transmission may be made by the source station or the destination station and may be conveyed to the relay station. Alternatively, the determination may be made by the relay station, e.g., based on metrics received from the source station or the destination station. In any case, in one design, the determination to forward the transmission may be made if the relay station has the best metric among at least one metric for at least one relay station detected by the destination station. In another design, the determination to forward the transmission may be made if the metric for the relay station exceeds first and/or second thresholds. The first threshold may be determined based on the best metric, and the second threshold may be determined based on a metric for the source station.

In one design, the relay station may generate the relay signal to be indistinguishable from the direct signal by the destination station. The direct signal and the relay signal may be transmitted in accordance with SFN. In another design, the relay station may generate the relay signal to be distinguishable from the direct signal, e.g., using a different scrambling code. The relay station may also generate the relay signal in accordance with STTD or SFTD.

Figure 7:
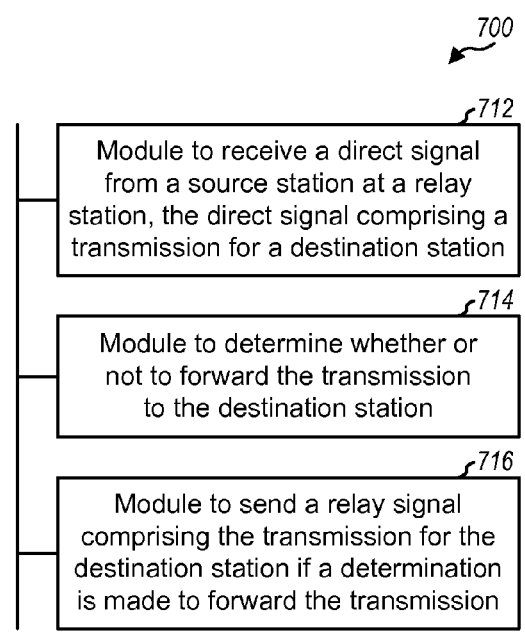
FIG. 7 shows an apparatus for relaying a transmission.

FIG. 7 shows a design of an apparatus 700 for relaying a transmission. Apparatus 700 includes a module 712 to receive a direct signal from a source station at a relay station, the direct signal comprising a transmission for a destination station, a module 714 to determine whether or not to forward the transmission to the destination station, and a module 716 to send a relay signal comprising the transmission for the destination station if a determination is made to forward the transmission.

The modules in FIGS. 5 and 7 may comprise processors, electronics devices, hardware devices, electronics components, logical circuits, memories, etc., or any combination thereof.

Figure 8:
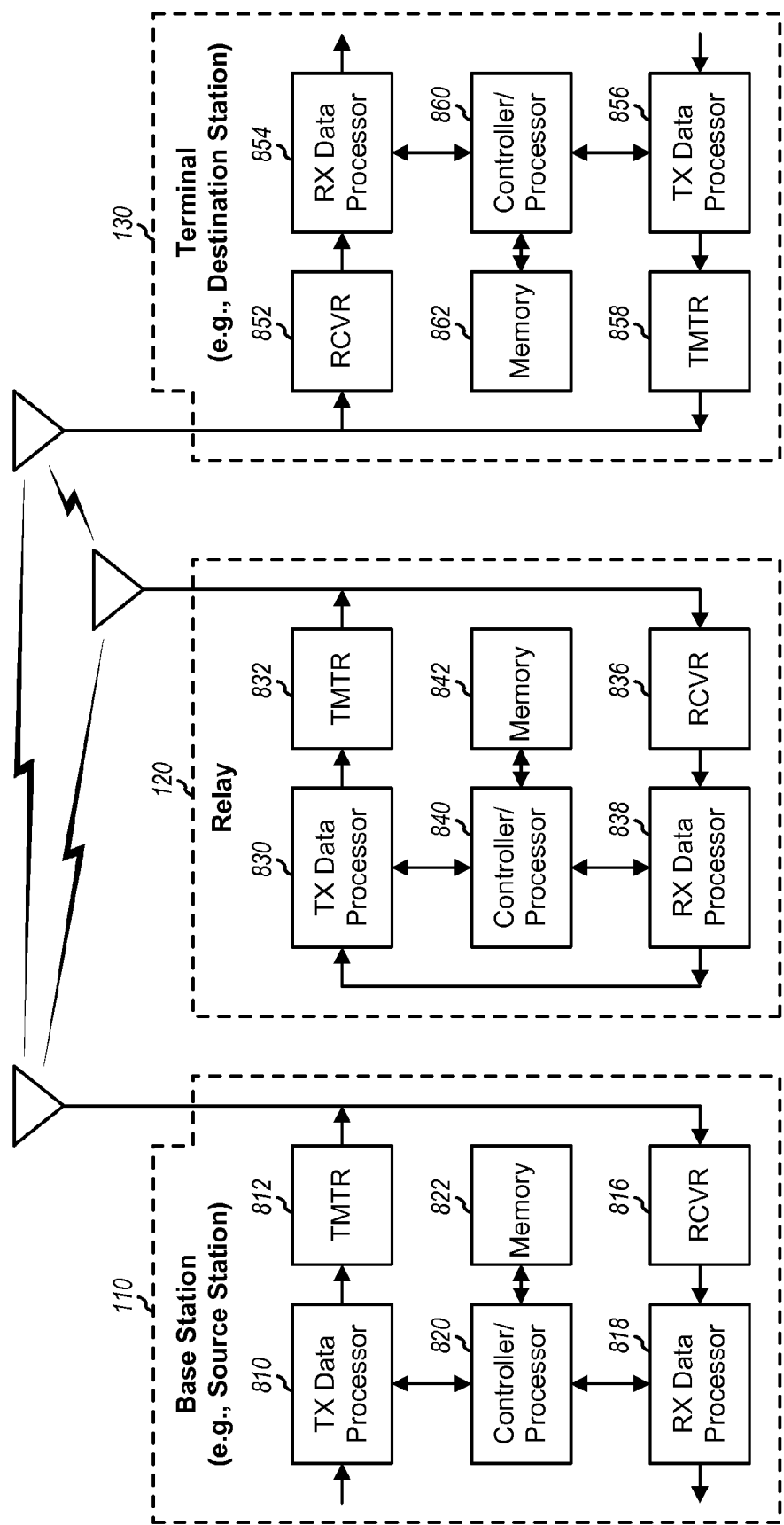
FIG. 8 shows a block diagram of a base station, a relay station, and a terminal.

FIG. 8 shows a block diagram of a design of base station 110, one relay 120, and terminal 130 in FIG. 1. Base station 110 may send transmissions to one or more terminals on the forward link and may also receive transmissions from one or more terminals on the reverse link. For clarity, processing for transmissions sent to and received from only terminal 130 is described below.

At base station 110, a transmit (TX) data processor 810 may receive packets of data to send to terminal 130 and may process (e.g., encode and modulate) each packet in accordance with a selected packet format to obtain data symbols. If HARQ is employed, then processor 810 may generate multiple transmissions of each packet and may provide one transmission at a time. Processor 810 may also process control information to obtain control symbols, generate pilot symbols, and multiplex the data symbols, the control symbols, and pilot symbols. Processor 810 may further process the multiplexed symbols (e.g., for OFDM, CDMA, etc.) to generate output samples. A transmitter (TMTR) 812 may condition (e.g., convert to analog, amplify, filter, and upconvert) the output samples to generate a forward link signal, which may be transmitted to relay 120 and terminal 130.

At relay 120, the forward link signal from base station 110 may be received and provided to a receiver (RCVR) 836. Receiver 836 may condition (e.g., filter, amplify, downconvert, and digitize) the received signal and provide input samples. A receive (RX) data processor 838 may process the input samples (e.g., for OFDM, CDMA, etc.) to obtain received symbols. Processor 838 may further process (e.g., demodulate and decode) the received symbols to recover the transmission (e.g., packet and control information) sent to terminal 130. A TX data processor 830 may process (e.g., encode and modulate) the recovered data and control information from processor 838 in the same manner as base station 110 to obtain data symbols and control symbols. Processor 830 may generate pilot symbols, multiplex the data and control symbols with the pilot symbols, and process the multiplexed symbol to obtain output samples. A transmitter 832 may condition the output samples and generate a forward link relay signal, which may be transmitted to terminal 130.

At terminal 130, the forward link signal from base station 110 and the forward link relay signal from relay 120 may be received and conditioned by a receiver 852, and processed by an RX data processor 854 to recover the transmission sent to terminal 130. A controller/processor 860 may generate feedback information for correctly decoded packets. Data and control information (e.g., feedback information) to be sent on the reverse link may be processed by a TX data processor 856 and conditioned by a transmitter 858 to generate a reverse link signal, which may be transmitted to base station 110 and relay 120.

At relay 120, the reverse link signal from terminal 130 may be received and conditioned by receiver 836, and processed by RX data processor 838 to recover the data and control information sent by terminal 130. The recovered data and control information may be processed by TX data processor 830 and conditioned by transmitter 832 to generate a reverse link relay signal, which may be transmitted to base station 110.

At base station 110, the reverse link signal from terminal 130 and the reverse link relay signal from relay 120 may be received and conditioned by a receiver 816, and processed by an RX data processor 818 to recover the data and control information sent by terminal 130. A controller/processor 820 may control transmission of data based on the control information from terminal 130.

Controllers/processors 820, 840 and 860 may direct operation at base station 110, relay 120, and terminal 130, respectively. Controllers/processors 820 and 860 may each perform or direct process 400 in FIG. 4 and/or other processes for the techniques described herein. Controller/processor 840 may perform or direct process 600 in FIG. 6 and/or other processes for the techniques described herein. Memories 822, 842 and 862 may store data and program codes for base station 110, relay 120, and terminal 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving a plurality of signals comprising a direct signal from a source station and at least one relay signal from at least one relay station at a destination station;
    determining metrics for the source station and the at least one relay station;
    selecting at least one signal to process from the plurality of received signals based on the metrics; and
    processing the at least one signal selected from the plurality of received signals to recover a transmission from the source station to the destination station, the processing comprising combining the direct signal and a relay signal from the at least one relay signal when both the direct signal and the relay signal are selected for processing from the plurality of received signals.

2. The method of claim 1, wherein determining the metrics for the source station and the at least one relay station comprises:
    receiving pilots from the source station and the at least one relay station, the pilot from each station being distinguishable by the destination station, and
    determining a metric for each of the source station and the at least one relay station based on the pilot received from each station.

3. The method of claim 1, wherein determining the metrics for the source station and the at least one relay station comprises determining a metric for each of the source station and the at least one relay station based on one or more of a received signal strength parameter, a received signal quality parameter, or a combination thereof.

4. The method of claim 1, wherein selecting the at least one signal to process from the plurality of received signals comprises selecting the direct signal when a metric for the source station exceeds a threshold.

5. The method of claim 4, wherein selecting the at least one signal to process from the plurality of received signals further comprises determining the threshold based on a predetermined value or a best metric selected from at least one metric for the at least one relay station.

6. The method of claim 1, wherein selecting the at least one signal to process from the plurality of received signals comprises:
    determining a threshold based on one or more of a best metric selected from at least one metric for the at least one relay station, a metric for the source station, a predetermined value, or a combination thereof, and
    determining whether to select each relay signal based on a metric for a relay station transmitting the relay signal and the threshold.

7. The method of claim 1, wherein selecting the at least one signal to process from the plurality of received signals comprises:
    determining a first threshold based on a best metric selected from at least one metric for the at least one relay station,
    determining a second threshold based on a metric for the source station, and
    selecting a relay signal from each relay station having a metric exceeding the first and second thresholds.

8. The method of claim 1, wherein selecting the at least one signal to process from the plurality of received signals comprises selecting a relay signal from a relay station having a best metric selected from at least one metric for the at least one relay.

9. The method of claim 8, wherein selecting the at least one signal to process from the plurality of received signals further comprises
    selecting the direct signal when a metric for the source station exceeds a first threshold determined based on the best metric, and
    selecting a relay signal from each remaining relay station having a metric exceeding at least one of a second threshold and a third threshold, the second threshold being determined based on the best metric, and the third threshold being determined based on the metric for the source station.

10. The method of claim 1, wherein each relay station having a relay signal selected for processing relays the transmission from the source station in the relay signal, and wherein each relay station having a relay signal not selected for processing does not relay the transmission from the source station in the relay signal.

11. The method of claim 1, wherein the direct signal and the at least one relay signal are transmitted in a single frequency network (SFN) manner.

12. The method of claim 1, wherein a plurality of signals are selected from the plurality of received signals for processing based on the metrics, and wherein processing the at least one selected signal comprises separately processing the selected plurality of signals.

13. The method of claim 12, further comprising combining the selected plurality of signals in accordance with space-time transmit diversity (STTD) or space-frequency transmit diversity (SFTD).

14. An apparatus for wireless communication, comprising:
means for receiving a plurality of signals comprising a direct signal from a source station and at least one relay signal from at least one relay station at a destination station;
means for determining metrics for the source station and the at least one relay station;
means for selecting at least one signal to process from the plurality of received signals based on the metrics; and
means for processing the at least one signal selected from the plurality of received signals to recover a transmission from the source station to the destination station, the means for processing comprising means for combining the direct signal and a relay signal from the at least one relay signal when both the direct signal and the relay signal are selected for processing from the plurality of received signals.

15. The apparatus of claim 14, wherein the means for determining metrics for the source station and the at least one relay station comprises
means for receiving pilots from the source station and the at least one relay station, the pilot from each station being distinguishable by the destination station, and
means for determining a metric for each of the source station and the at least one relay station based on the pilot received from each station.

16. The apparatus of claim 14, wherein the means for selecting at least one signal to process from the plurality of received signals comprises
means for determining a threshold based on a predetermined value or a best metric selected from at least one metric for the at least one relay station, and
means for selecting the direct signal when a metric for the source station exceeds the threshold.

17. The apparatus of claim 14, wherein the means for selecting at least one signal to process from the plurality of received signals comprises means for selecting a relay signal from each relay station having a metric exceeding at least one of a first threshold and a second threshold, the first threshold being determined based on a best metric selected from at least one metric for the at least one relay, and the second threshold being determined based on a metric for the source station.

18. An apparatus for wireless communication, comprising:
a memory unit; and
at least one processor coupled to the memory unit, wherein the at least one processor is configured:
to receive a plurality of signals comprising a direct signal from a source station and at least one relay signal from at least one relay station at a destination station,
to determine metrics for the source station and the at least one relay station,
to select at least one signal to process from the plurality of received signals based on the metrics,
to process the at least one signal selected from the plurality of received signals to recover a transmission from the source station to the destination station, and
to combine the direct signal and a relay signal from the at least one relay signal when both the direct signal and the relay signal are selected for processing from the plurality of received signals.

19. The apparatus of claim 18, wherein the at least one processor is further configured to receive pilots from the source station and the at least one relay station, the pilot from each station being distinguishable by the destination station, and to determine a metric for each of the source station and the at least one relay station based on the pilot received from each station.

20. The apparatus of claim 18, wherein the at least one processor is further configured to determine a threshold based on a predetermined value or a best metric selected from at least one metric for the at least one relay station, and to select the direct signal when a metric for the source station exceeds the threshold.

21. The apparatus of claim 18, wherein the at least one processor is further configured to select a relay signal from each relay station having a metric exceeding at least one of a first threshold and a second threshold, the first threshold being determined based on a best metric among selected from at least one metric for the at least one relay, and the second threshold being determined based on a metric for the source station.

22. A computer program media, comprising:
a non-transitory computer-readable medium comprising:
code for causing at least one computer to receive a plurality of signals comprising a direct signal from a source station and at least one relay signal from at least one relay station at a destination station,
code for causing the at least one computer to determine metrics for the source station and the at least one relay station,
code for causing the at least one computer to select at least one signal to process from the plurality of received signals based on the metrics, and
code for causing the at least one computer to process the at least one signal selected from the plurality of received signals to recover a transmission from the source station to the destination station, the code for causing the at least one computer to process further comprising code for causing the at least one computer to combine the direct signal and a relay signal from the at least one relay signal when both the direct signal and the relay signal are selected for processing from the plurality of received signals.

23. A method for wireless communication, comprising:
receiving a direct signal from a source station at a relay station, the direct signal comprising a transmission for a destination station;
determining whether or not to forward the transmission to the destination station; and
transmitting a relay signal comprising the transmission for the destination station when a determination is made to forward the transmission, the transmission being forwarded when a metric for the relay station exceeds one or more of a first threshold, a second threshold, or a combination thereof, the first threshold being determined based on a best metric selected from at least one metric for at least one relay station detected by the destination station, and the second threshold being determined based on a metric for the source station.

24. The method of claim 23, further comprising:
transmitting the relay signal without the transmission for the destination station when a determination is made to not forward the transmission.

25. The method of claim 23, further comprising:
listening for new transmissions from the source station when a determination is made to not forward the transmission.

26. The method of claim 23, further comprising:
generating the relay signal to be indistinguishable from the direct signal by the destination station, the direct signal and the relay signal being transmitted in a single frequency network (SFN) manner.

27. The method of claim 23, further comprising:
generating the relay signal to be distinguishable from the direct signal by the destination station.

28. The method of claim 23, further comprising:
generating the relay signal in accordance with space-time transmit diversity (STTD) or space-frequency transmit diversity (SFTD).

29. An apparatus for wireless communication, comprising:
means for receiving a direct signal from a source station at a relay station, the direct signal comprising a transmission for a destination station;
means for determining whether or not to forward the transmission to the destination station; and
means for transmitting a relay signal comprising the transmission for the destination station when a determination is made to forward the transmission, the transmission being forwarded when a metric for the relay station exceeds one or more of a first threshold, a second threshold, or a combination thereof, the first threshold being determined based on a best metric selected from at least one metric for at least one relay station detected by the destination station, and the second threshold being determined based on a metric for the source station.

30. The apparatus of claim 29, further comprising:
means for transmitting the relay signal without the transmission for the destination station when a determination is made to not forward the transmission.

* * * * *